United States Patent
Chen et al.

(10) Patent No.: US 8,176,230 B2
(45) Date of Patent: May 8, 2012

(54) WIRELESS FLASH MEMORY CARD EXPANSION SYSTEM

(75) Inventors: Ben Wei Chen, Fremont, CA (US);
Ngoc Le, Irvine, CA (US); David Sun, Fountain Valley, CA (US)

(73) Assignee: Kingston Technology Corporation, Fountain Valley, CA (US)

( * ) Notice: Subject to any disclaimer, the term of this patent is extended or adjusted under 35 U.S.C. 154(b) by 561 days.

(21) Appl. No.: 11/399,975

(22) Filed: Apr. 7, 2006

(65) Prior Publication Data

US 2007/0239929 A1    Oct. 11, 2007

(51) Int. Cl.
*G06F 12/00* (2006.01)
*G06F 13/14* (2006.01)

(52) U.S. Cl. ............... 711/103; 711/115; 711/E12.001; 709/217

(58) Field of Classification Search .......... 711/103–104, 711/115; 709/217
See application file for complete search history.

(56) References Cited

U.S. PATENT DOCUMENTS

| | | | |
|---|---|---|---|
| 5,663,901 A * | 9/1997 | Wallace et al. | 711/103 |
| 5,894,425 A | 4/1999 | Saliba | |
| 5,914,980 A | 6/1999 | Yokota et al. | |
| 6,148,354 A | 11/2000 | Ban et al. | |
| 6,167,514 A | 12/2000 | Matsui et al. | |
| 6,233,641 B1 * | 5/2001 | Graham et al. | 710/316 |
| 6,405,278 B1 | 6/2002 | Liepe | |
| 6,829,672 B1 | 12/2004 | Deng et al. | |
| 6,842,606 B1 | 1/2005 | Takemura | |
| 2002/0174337 A1 * | 11/2002 | Aihara | 713/172 |
| 2003/0030839 A1 * | 2/2003 | Walters et al. | 358/1.15 |
| 2003/0084223 A1 * | 5/2003 | Jeddeloh | 710/305 |
| 2003/0095521 A1 * | 5/2003 | Haller et al. | 370/338 |
| 2004/0205301 A1 * | 10/2004 | Hara et al. | 711/137 |
| 2005/0018524 A1 * | 1/2005 | Zitlaw et al. | 365/230.06 |
| 2005/0097263 A1 * | 5/2005 | Wurzburg | 711/103 |
| 2005/0141273 A1 * | 6/2005 | Park et al. | 365/185.12 |
| 2006/0007151 A1 | 1/2006 | Ram | |
| 2006/0039221 A1 | 2/2006 | Fukuda | |
| 2006/0053246 A1 | 3/2006 | Lee | |
| 2006/0212911 A1 * | 9/2006 | MacMullan et al. | 725/81 |
| 2006/0261166 A1 * | 11/2006 | Baumgartner et al. | 235/451 |

FOREIGN PATENT DOCUMENTS

CN    1417954 A    5/2003

* cited by examiner

*Primary Examiner* — Michael Krofcheck
(74) *Attorney, Agent, or Firm* — Sawyer Law Group, P.C.

(57) ABSTRACT

A Flash memory card system is disclosed. The Flash memory card system comprises a Flash memory wireless host adapter and a Flash memory bus wireless device. The Flash memory wireless host adapter comprises a Flash memory card connector and a Flash memory controller coupled to the Flash memory card connector. The Flash-52 memory card signals are converted to standard Flash memory internal bus signals by the Flash memory controller. The host adapter further comprises a Flash memory wireless module coupled to the Flash memory controller for receiving and transmitting the standard Flash memory bus signals wirelessly. The Flash-51 memory bus wireless device comprises a Flash memory bus wireless device adapter coupled to a Flash memory. The device adapter is paired to the wireless module for receiving and transmitting the standard Flash memory bus signals wirelessly. A host device storage capacity utilizing the Flash memory card system is expanded.

29 Claims, 8 Drawing Sheets

WIRELESS FLASH MEMORY CARD EXPANSION SYSTEM

FIELD OF THE INVENTION

The present invention relates generally to flash memory cards and more specifically to flash memory and expansion of a device using such cards.

BACKGROUND OF THE INVENTION

Flash memory cards have become a standard portable and expandable storage medium for many host devices, including digital still cameras (DSC), personal digital assistants (PDA), MP3 players, notebook PCs, personal media players (PMP), cell phones and other portable consumer electronics gadgets. As a portable device shrinks in physical size, the form factor of flash memory cards shrinks as well. But the demand for higher functionality in audio and video aspects creates a growing demand for increased memory capacity within flash memory cards. The shrinkage of the flash memory card form factor makes it very difficult, if not impossible, to deliver the highest density flash memory storage for current small size portable devices.

Accordingly, what is needed is a system and method for providing more storage capacity to a portable device while also not adding more physical size to such a device. The present invention addresses such a need.

SUMMARY OF THE INVENTION

A flash memory card system is disclosed. The flash memory card system comprises a flash memory wireless host adapter and a Flash memory bus wireless device. The flash memory wireless host adapter comprises a flash memory card connector and a flash memory controller coupled to the flash memory card connector; wherein the flash memory card command, data and status signals are converted to standard flash memory internal bus signals by the flash memory controller. The host adapter further comprises a flash memory wireless module coupled to the flash memory controller for receiving and transmitting the standard flash memory internal bus signals wirelessly. The flash memory bus wireless device comprises a flash memory bus wireless device adapter coupled to a flash memory; wherein the device adapter is paired to the wireless module for receiving and transmitting the standard flash memory internal bus signals wirelessly; wherein a Host device storage capacity utilizing the flash memory card system is expanded.

DETAILED DESCRIPTION

The present invention relates generally to flash memory cards and more specifically to flash memory and expansion of a device using such cards. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
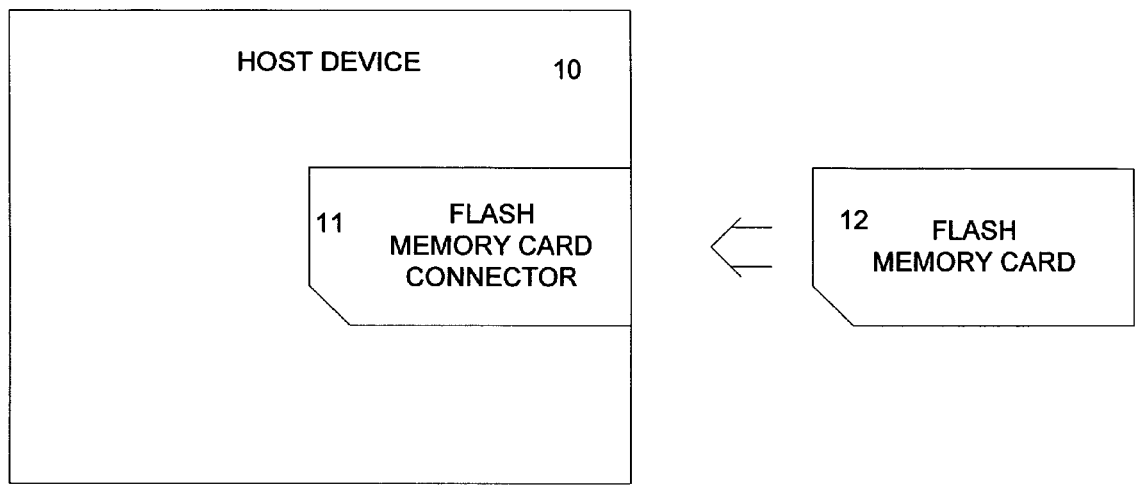
FIG. 1 shows a host device and flash memory card (prior art).

FIG. 1 shows a host device 10 and a flash memory card 12 (prior art). The host device 10, as shown in FIG. 1, includes a flash memory card connector 11. The host device 10 is able to accept a Flash memory card 12 to expand its storage density.

Figure 2:
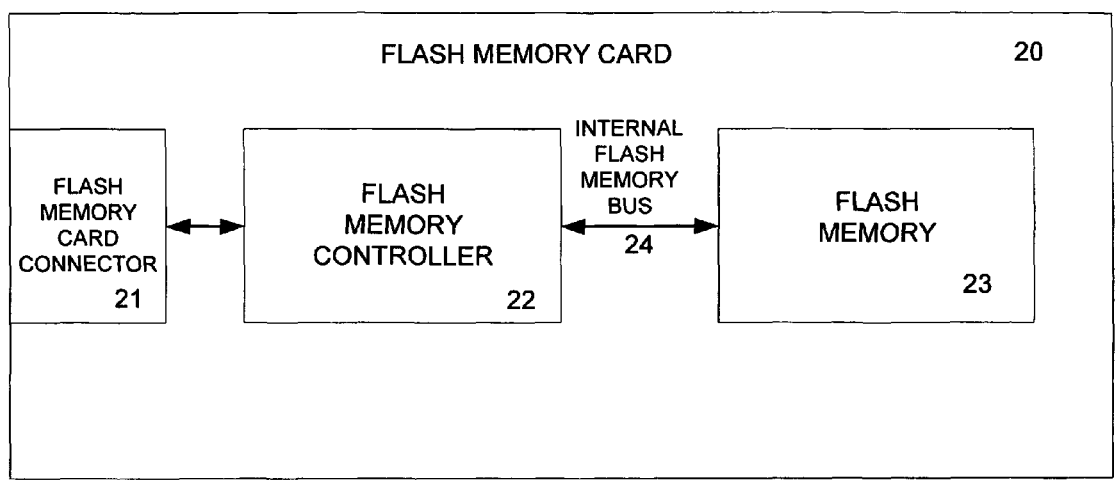
FIG. 2 is a block diagram of a flash memory card (prior art).

FIG. 2 is a block diagram of a flash memory card 20 (prior art). The flash memory card 20, as shown in FIG. 2, comprises three functional blocks, including a flash memory card connector 21, a flash memory controller 22, and flash memory 23. These blocks are interconnected together as shown in FIG. 2. The flash memory controller 22 is connected with flash memory 23 through a flash memory internal bus 24.

Figure 3:
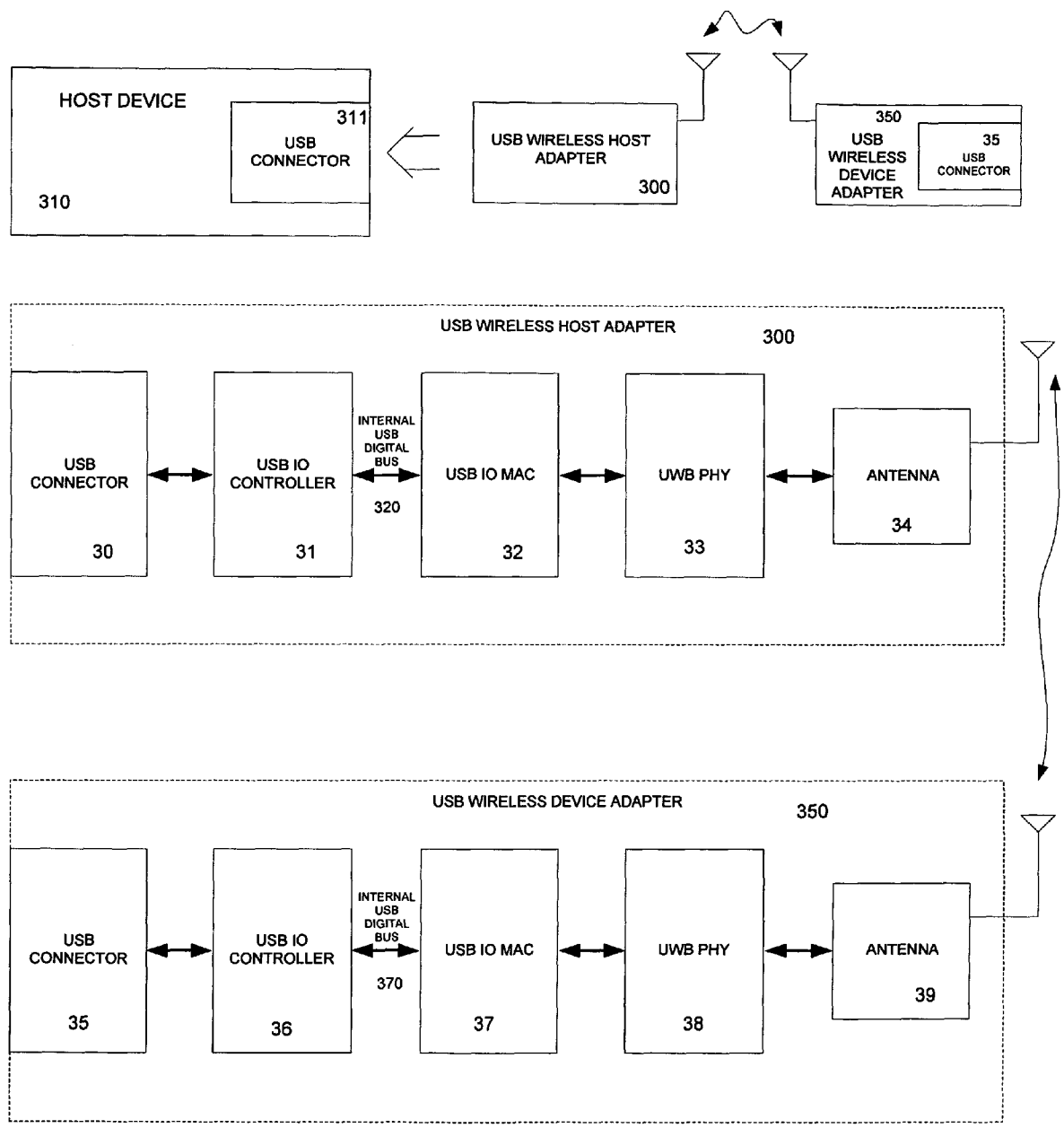
FIG. 3 is a block diagram of a USB wireless host adapter and device adapter (prior art).

FIG. 3 is a block diagram of a USB wireless host adapter 300 and device adapter 350 (prior art). Currently, a host device 310, as shown in FIG. 3, can extend its USB connector 311 wirelessly through a plugged in USB wireless host adapter 300. It is then connected wirelessly through radio frequency transmission to a USB wireless device adapter 350, which has a built-in USB connector 35. USB connector 35 can then be used to connect any USB compatible device wirelessly from the host device 310, as if it is connected physically through a wire.

The USB wireless host adapter 300 comprises a USB connector 30, a USB IO controller 31, an internal USB digital bus 320, a USB IO media access control (MAC) 32, an ultrawideband (UWB) physical layer (PHY) 33, and an antenna 34.

The USB wireless device adapter 350 comprises a USB connector 35, a USB IO controller 36, an internal USB digital bus 370, a USB IO media access control (MAC) 37, an ultrawideband (UWB) physical layer (PHY) 38, and an antenna 39.

As is shown in FIG. 3, the USB wireless host adapter 300 and the USB wireless device adapter 350 have symmetrical architecture. Functionally, they are essentially identical adapters with bi-directional operation capability.

Figure 4:
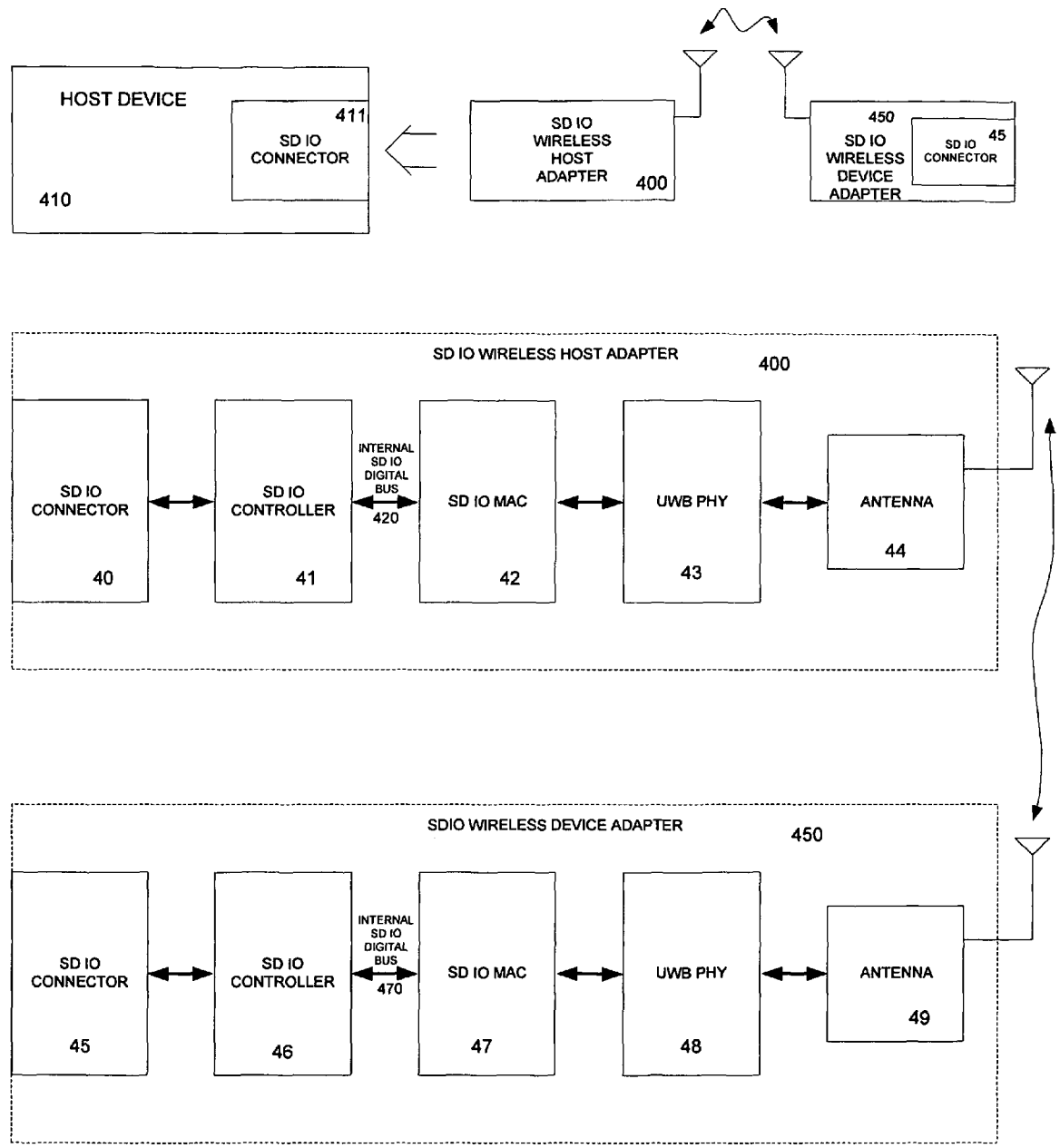
FIG. 4 is a block diagram of an SD IO wireless host adapter and device adapter (prior art).

FIG. 4 is a block diagram of a SD IO wireless host adapter 400 and device adapter 450 (prior art). Another host device 410, as shown in FIG. 4, can extend its secure digital (SD) IO connector 411 wirelessly through a plugged in SD IO wireless host adapter 400. The host device 410 is then connected wirelessly by radio frequency transmission to a SD IO wireless device adapter 450 which has a built-in SD IO connector

45. The SD IO connector 45 can then be used to connect any SD IO compatible device wirelessly from the host device 410, as if it is connected physically through a wire.

The SD IO wireless host adapter 400 comprises a SD IO connector 40, a SD IO controller 41, an internal SD IO digital bus 420, a SD IO media access control (MAC) 42, an ultra-wideband (UWB) physical layer (PHY) 43, and an antenna 44.

The SD IO wireless device adapter 450 comprises a SD IO connector 45, a SD IO controller 46, an internal SD IO digital bus 470, a SD IO media access control (MAC) 47, an ultra-wideband (UWB) physical layer (PHY) 48, and an antenna 49.

As is shown in FIG. 4, the SD IO wireless host adapter 400 and the SD IO wireless device adapter 450 have symmetrical architecture. Functionally, they are essentially identical adapters with bi-directional operation capability.

The present invention has the following objectives:
1. Wireless storage expansion is provided to a portable device.
2. Storage density can be efficiently and easily expanded to existing portable device hardware and software.
3. Standard interface can be provided to existing Flash memory or storage media for easy implementation and scalability.
4. Ultra-high speed radio frequency physical links can be taken advantage of for data transmission.
5. Less silicon gates and power are consumed in wireless devices.

Embodiments in Accordance with the Present Invention

Figure 5A:
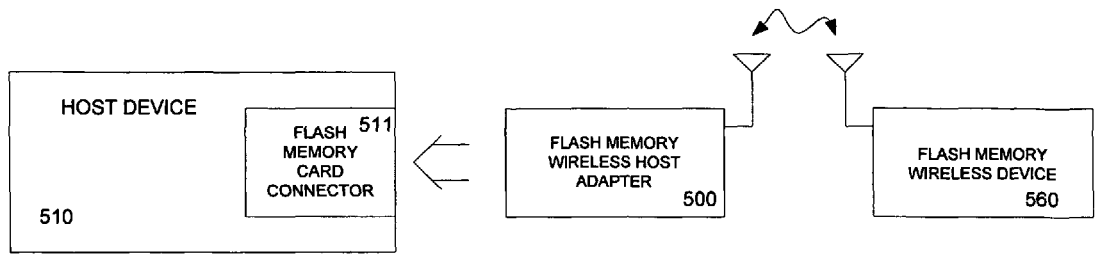
FIG. 5A is a block diagram of a host device, flash memory wireless host adapter and flash memory wireless device in accordance with the present invention.
Figure 5B:
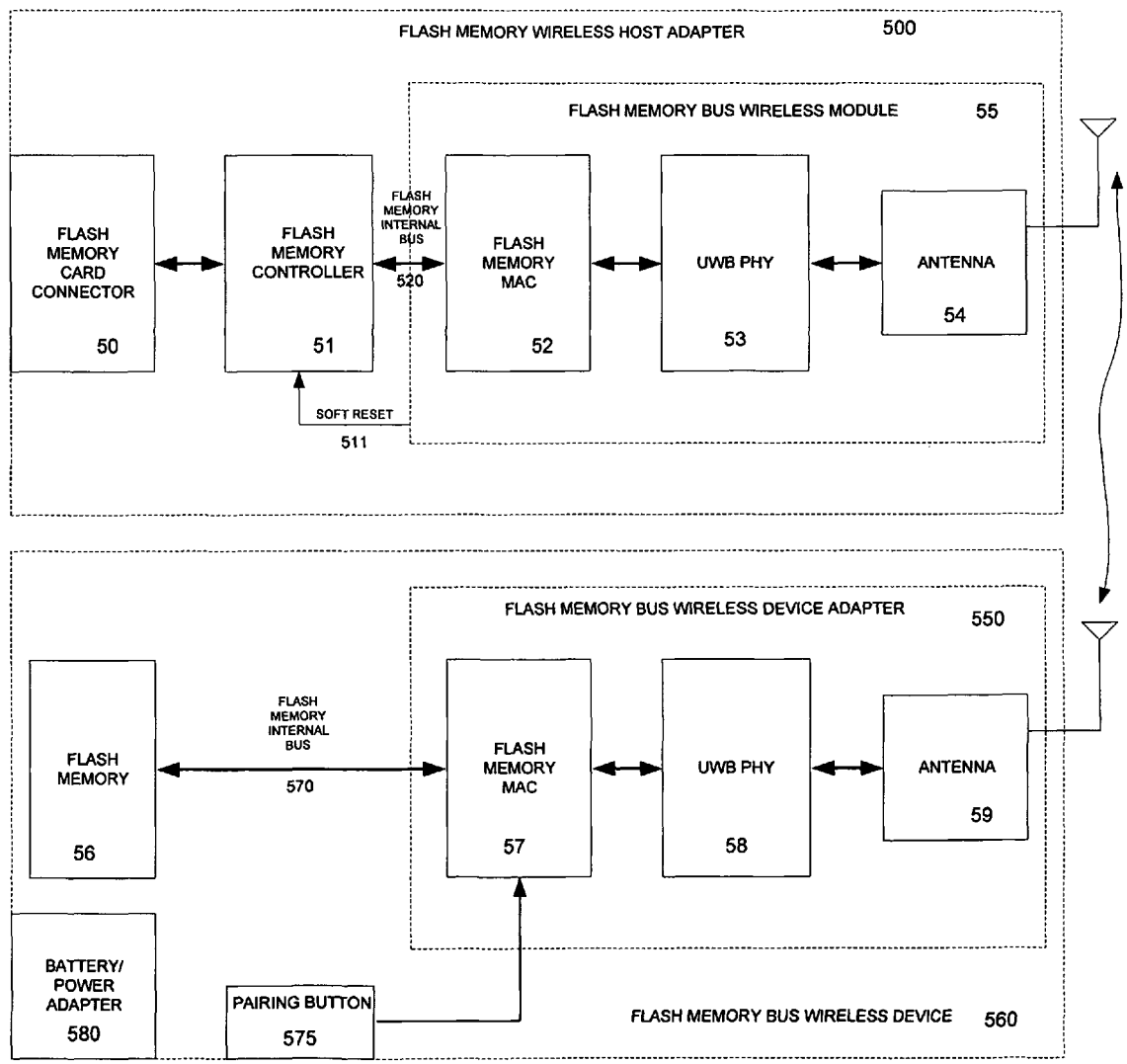
FIG. 5B is an expanded block diagram of a flash memory wireless host adapter and a flash memory bus wireless device in accordance with the present invention.

A system and method in accordance with the present invention provides a flash memory card expansion system. FIG. 5A is a block diagram of a host device 510, flash memory wireless host adapter 500 and flash memory bus wireless device 560 in accordance with the present invention. FIG. 5B is an expanded block diagram of a flash memory wireless host adapter 500 and a flash memory bus wireless device 560. Referring to both FIGS. 5A and 5B, the system comprises a flash memory wireless host adapter 500 and a flash memory wireless device 560. The flash memory wireless host adapter 500 is plugged into a flash memory card connector 511 of a host device 510 which can be one of many devices including a digital still camera (DSC), personal digital assistant (PDA), MP3 player, notebook PC, personal media player (PMP), cell phone and other portable consumer electronics devices.

Instead of converting general purpose USB IO or SD IO, as in the conventional design of FIGS. 3 and 4, the present invention, as shown in greater detail in FIG. 5B, first relies on a flash memory controller 51 to capture and translate flash memory card command, data and status through the flash memory card connector 50. The flash memory controller 51 is specific to the flash memory card connector 50. The flash memory card connector 50 can be of different interface standards including Secure Digital (SD), Compact Flash (CF), MultiMediaCard (MMC), Memory Stick (MS), USB and others. One of ordinary skill in the art would recognize that many different variations of the above mentioned interface standards could be utilized, and that utilization would be within the spirit and scope of the present invention.

The flash memory card command, data and status signals are converted to standard Flash memory internal bus signals 520. The signals are then fed into the Flash memory bus wireless module 55.

The flash memory bus wireless module 55 comprises a flash memory media access control (MAC) 52, an ultra-wideband (UWB) physical layer (PHY) 53, and an antenna 54. All traffic through the blocks is bi-directional.

The corresponding flash memory bus wireless device 560 comprises flash memory 56, a battery/power adapter 580, a flash memory internal bus 570, and a flash memory bus wireless device adapter 550. Flash memory 56 interfaces with flash memory bus wireless device adapter 550 through the flash memory internal bus 570; in the same way as flash memory controller 51 interfaces with flash memory bus wireless module 55 through the flash memory internal bus 520.

The flash memory bus wireless device adapter 550 comprises a flash memory media access control (MAC) 57, an ultra-wideband (UWB) physical layer (PHY) 58, and an antenna 59. All traffic through blocks are bi-directional.

An optional interface pairing activation input button 575 is used by flash memory bus wireless device adapter 550 to pair with flash memory bus wireless module 55. During initialization, the pairing button 575 is pressed to establish pairing between flash memory bus wireless module 55 and flash memory bus wireless device adapter 550. Automatic or software pairing methods are also possible between the module 55 and adapter 550.

In essence, the flash memory bus wireless module 55 and the flash memory bus wireless device adapter 550 are identical. They can then be implemented as a standard functional module as a building block of the invention.

Operations Between Host Device and Flash Memory Controller

There are four types of operations between the host device 510 and flash memory controller 51. The operation types include command write, data write, status read and data read. These four types of operations are translated into four corresponding operation requests (flash Command Write, flash Data Write, flash Status Read, and flash Data Read) by the flash memory controller 51 and sent to the actual flash memory 56.

In order to simplify the scenario, only those operation requests from the flash memory controller 51 to the flash memory 56 are described herein below.

Flash Command Write operation request The flash Command Write operation request is done with write-through mechanism between flash Memory Controller 51 and flash Memory MAC 52. It means flash Memory Controller 51 conducts flash Command Write to flash Memory Mac 52 with no delay, as if flash Memory 56 is physically connected to the controller 51. The flash memory controller 51 initiates flash Command Write through flash memory internal bus 520 to flash memory MAC 52. It is then buffered, scrambled, encrypted and sent to UWB PHY 53. The flash command is then encoded and transmitted through UWB PHY 53 radio frequency through antenna 54. On the receiving end of Flash memory bus wireless device 560, the radio frequency signal is received by antenna 59. It then fed into UWB PHY 58 through internal decoder. The resulting data is then input into flash memory MAC 57, decrypted and de-scrambled. The final digital data is finally reverted back to the original flash command and sent through the flash memory internal bus 570. The flash memory internal bus 570 is compatible with universal flash memory technology. The final corresponding flash command is then written into flash memory 56, completing the flash Command Write operation request.

Flash Data Write Operation Request

The flash Data Write operation request is done with write-through mechanism between flash Memory Controller 51 and flash Memory MAC 52. It means flash Memory Controller 51 conducts flash Data Write to flash Memory Mac 52 with no delay, as if flash Memory 56 is physically connected to the controller 51. But the flash Data Write operation request is done with delay-write mechanism between flash Memory MAC 52 and flash Memory 56. It means flash Memory MAC 52 delays flash Data Write to flash Memory 56 after the actual data write request operation ends. It performs retry, if necessary, depending on the asynchronous nature of radio link condition.

The flash memory controller 51 initiates flash Data Write operation request through flash memory internal bus 520 to flash memory MAC 52. It is then buffered, scrambled and encrypted and sent to UWB PHY 53. The flash data is then encoded and transmitted through UWB PHY 53 with radio frequency through antenna 54. As soon as the flash Data Write operation request is issued, the flash memory controller 51 considers it completed, even though the actual operation is not yet serviced by the device adapter 550.

On the receiving end of flash memory bus wireless device 560, the radio frequency signal is received by antenna 59. It is then fed into UWB PHY 58 through internal decoder. The resulting data is then input into the flash Memory MAC 57, decrypted and de-scrambled. The final digital data is finally reverted back to the original flash data. It is buffered and sent through the flash memory internal bus 570. The flash memory internal bus 570 is compatible with universal flash memory technology. The final corresponding flash data is then written into flash memory 56, completing the flash Data Write operation request.

Flash Status Read Operation Request

The read-ahead mechanism means flash Memory Controller 51 conducts Flash Status Read from flash Memory Mac 52 with no delay, if the read status is already ready at the time of request. But the flash Status Read operation request is done with delay-read mechanism between flash Memory MAC 52 and flash Memory 56. It means flash Memory MAC 52 delays flash Status Read from flash Memory 56 after the actual status read request operation ends. It performs retry, if necessary, depending on the asynchronous nature of radio link condition.

The flash memory controller 51 initiates flash Status Read operation request through flash memory internal bus 520 to flash memory MAC 52. The flash memory MAC 52 decides if it already has proper response for the flash Status Read operation request. If so, it responds accordingly and completes flash Status Read operation request. It is using the read-ahead mechanism from the previous flash Status Read operation request to acquire the flash read status.

If the proper flash read status is not ready, the flash Memory MAC 52 returns with a BUSY Status to the controller 51. It then uses the delay-read mechanism to fulfill the flash Status Read operation request from flash Memory 56. The original flash Status Read operation request is then scrambled, encrypted and sent to UWB PHY 53. It is then encoded and transmitted through UWB PHY 53 with radio frequency through antenna 54.

On the receiving end of flash memory bus wireless device 560, the radio frequency signal is received by antenna 59. It is then fed into UWB PHY 58 through internal decoder. The resulting data is then input into flash memory MAC 57, decrypted and de-scrambled. The final digital data is finally reverted back to the original flash Status Read operation request and sent through the flash memory internal bus 570. The flash memory internal bus 570 is compatible with universal flash memory technology. The corresponding flash Status Read operation request is then sent to flash memory 56. The flash memory MAC 57 continues to wait until timeout or proper status is retrieved from flash memory 56. In either case, the status is finally sent back by flash memory MAC 57, scrambled, encrypted and sent to UWB PHY 53. The flash status is then encoded and transmitted through UWB PHY 58 with radio frequency through antenna 59.

On the receiving end of flash memory bus wireless module 55, the radio frequency signal is received by antenna 54. It is then fed into UWB PHY 53 through internal decoder. The resulting data is then input into flash memory MAC 52, decrypted and de-scrambled. The final digital data is finally reverted back to the original flash Status Read operation request and sent through the flash memory internal bus 520. The flash memory internal bus 520 is compatible with universal flash memory technology. The corresponding flash Status is then ready to be retrieved by the next flash Status Read operation request from the flash memory controller 51. Again, it is using read-ahead mechanism to anticipate the deferred flash Status Read operation request. As soon as the next flash Status Read operation request is issued by the flash memory controller 51, the status is ready and the flash Status Read operation request completes. If the wireless communication link times out, a retry operation is necessary in order to compensate for its error prone and asynchronous nature.

Flash Data Read Operation Request

The read-ahead mechanism means flash Memory Controller 51 conducts flash Data Read from flash Memory Mac 52 with no delay, if the read data is already ready at the time of request. But the flash Data Read operation request is done with delay-read mechanism between flash Memory MAC 52 and flash Memory 56. It means flash Memory MAC 52 delays flash Data Read from flash Memory 56 after the actual data read request operation ends. It performs retry, if necessary, depending on the asynchronous nature of radio link condition.

The flash memory controller 51 initiates flash Data Read operation request through flash memory internal bus 520 to flash memory MAC 52. The flash memory MAC 52 decides if it has proper data ready for the flash Data Read operation request. If so, it responds accordingly and completes flash Data Read operation request. It is using the read-ahead mechanism from the previous flash Data Read operation request to acquire the flash read data.

If the proper flash read data is not ready, the flash Memory MAC 52 returns with a BUSY Status to the controller 51. It then uses the delay-read mechanism to fulfill the flash Data Read operation request from flash Memory 56. The original flash Data Read operation request is then scrambled, encrypted and sent to UWB PHY 53. It is then encoded and transmitted through UWB PHY 53 with radio frequency through antenna 54.

On the receiving end of flash memory bus wireless device 560, the radio frequency signal is received by antenna 59. It is then fed into UWB PHY 58 through internal decoder. The resulting data is then input into flash memory MAC 57, decrypted and de-scrambled. The final digital data is finally reverted back to the original flash Data Read operation request and sent through the flash memory internal bus 570. The flash memory internal bus 570 is compatible with universal flash memory technology. The corresponding flash Data Read operation request is then sent to flash memory 56. The flash memory MAC 57 continues to wait until timeout or proper data is retrieved from flash memory 56. In either case, the resulting data or status is finally sent back by flash memory MAC 57, scrambled, encrypted and sent to UWB PHY 53. The flash data or status is then encoded and transmitted through UWB PHY 58 with radio frequency through antenna 59.

On the receiving end of flash memory bus wireless module 55, the radio frequency signal is received by antenna 54. It is then fed into UWB PHY 53 through internal decoder. The resulting data is then input into flash memory MAC 52, decrypted and de-scrambled. The final digital data is finally reverted back to the original flash Data Read operation request and sent through the flash memory internal bus 520. The flash memory internal bus 520 is compatible with universal flash memory technology. The corresponding flash Data is then ready to be retrieved by the next flash Data Read operation request from the flash memory controller 51. Again, it is using read-ahead mechanism to anticipate the deferred flash Data Read operation request. As soon as the next flash Data Read operation request is issued by the flash memory controller 51, the data is ready and the flash Data Read operation request completes. If the wireless communication link times out, a retry operation is necessary in order to compensate for its error prone and asynchronous nature.

The flash memory MAC 52 is ready to return READY status to flash Data Read operation request. As soon as the next flash Data Read operation request is issued by the flash memory controller 51, the flash Data is returned from the internal data buffer and the Flash Data Read operation request completes.

Compared with conventional wireless adapters as shown in FIG. 3 and FIG. 4, the present invention is more efficient in implementing the flash memory bus wireless device 560. The SD IO wireless device adapter 450 and the USB wireless device adapter 350 would have to add another flash memory card connector 50, another flash memory controller 51, and flash memory 56, in order to achieve the same functionality of the flash memory bus wireless device 560. It results in four more functional blocks with two physical connectors and thousands more silicon gates in case of conventional wireless devices. The present invention clearly has an advantage in cost saving, reduced physical size and less power consumption in the portable flash memory bus wireless device 560.

Alternate Exemplary Embodiment

Figure 6A:
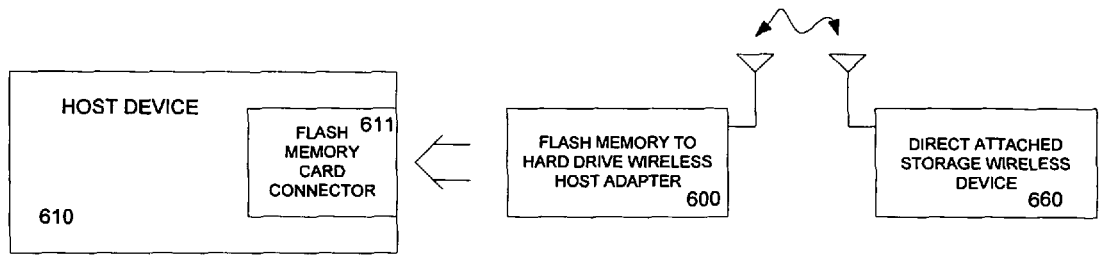
FIG. 6A is a block diagram of a host device, flash memory to hard drive wireless host adapter and direct attached storage wireless device.
Figure 6B:
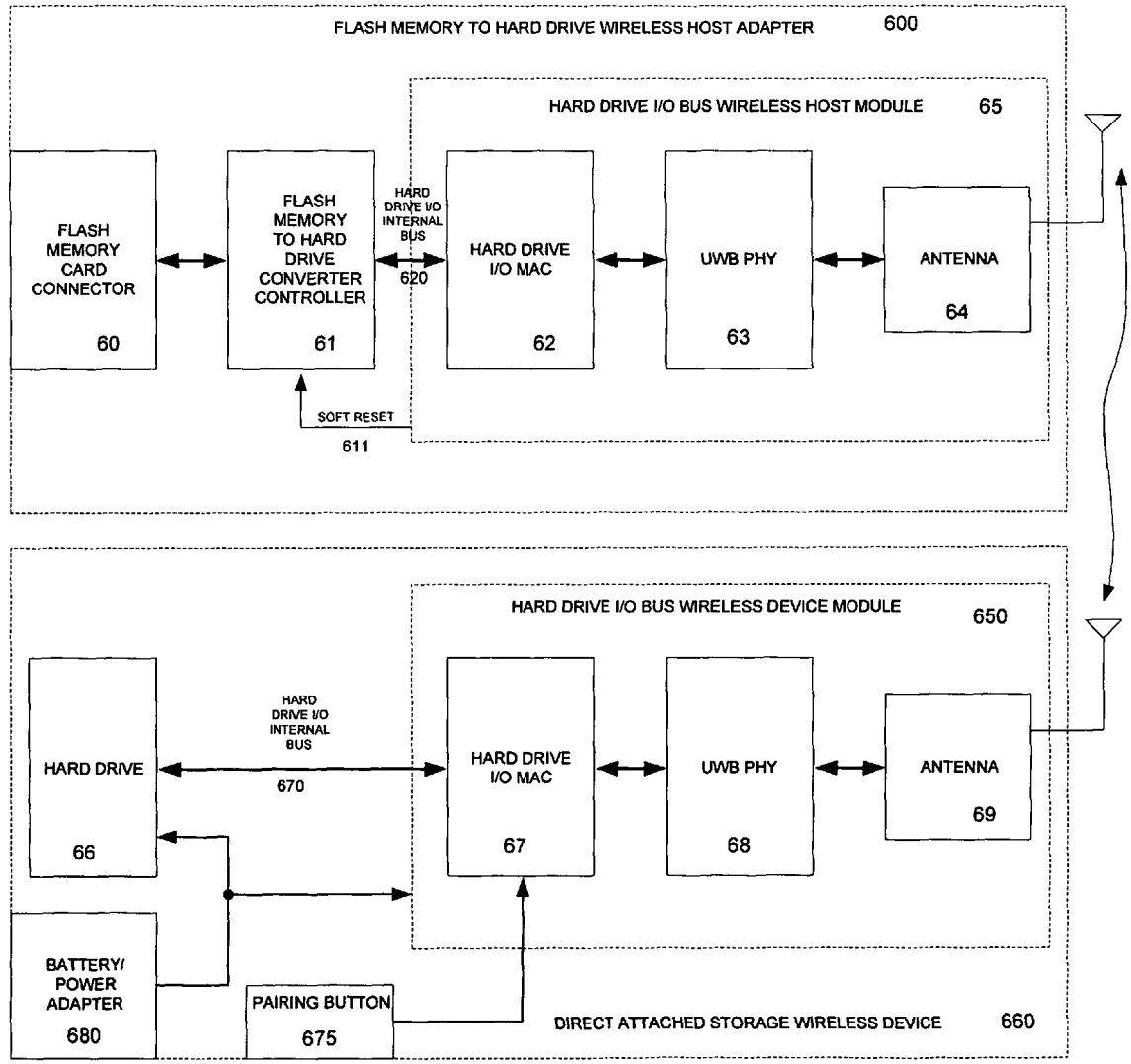
FIG. 6B is a block diagram of a flash memory to hard drive wireless host adapter and a direct attached storage wireless device.

In order to further extend the storage expansion beyond flash memory, it is possible to add standard hard drive storage wirelessly through the same flash memory card adapter in the host device, as shown in FIGS. 6A and 6B.

FIG. 6A is a block diagram of a host device, flash memory to hard drive wireless host adapter and direct attached storage wireless device. FIG. 6B is an expanded block diagram of a flash memory to hard drive wireless host adapter 600 and a direct attached storage wireless device 660. The present invention, as is shown in FIG. 6A, creates a flash memory card expansion system. It comprises two functional blocks, a flash memory to hard drive wireless host adapter 600 and a direct attached storage wireless device 660. flash memory to hard drive wireless host adapter 600 is plugged into a flash memory card connector 611 of a host device 610 that can be one of many devices including digital still cameras (DSC), personal digital assistants (PDA), MP3 players, notebook PCs, personal media players (PMP), cell phones and other portable consumer electronics devices.

The architecture of the alternate embodiment is similar to that of the above mentioned invention. FIG. 6B shows further detail of an alternate embodiment of the present invention. The derivatives are:

1. flash memory controller 51 is changed to flash Memory To Hard Drive Converter Controller 61.
2. flash memory internal bus 520 is changed to hard drive I/O internal bus 620. Flash memory internal bus 570 is changed to hard drive I/O internal bus 670.
3. flash memory 56 is changed to hard drive 66.
4. flash Memory MAC 52 is changed to Hard Drive I/O MAC 62. flash Memory MAC 57 is changed to Hard Drive I/O MAC 67.
5. flash memory wireless host adapter 500 is changed to flash memory to Hard Drive Wireless host adapter 600.
6. flash memory bus wireless module 55 is changed to Hard Drive I/O Bus Wireless host module 65.
7. flash memory bus wireless device 560 is changed to Direct Attached Storage Wireless Device 660.
8. flash memory bus wireless device adapter 550 is changed to Hard Drive I/O Bus Wireless Device module 650.
9. flash operation request is changed to hard drive operation request.

Ultra-wideband (UWB) physical layer (PHY) 53 or 63 is one of the radio frequency physical link implementations. Any radio frequency physical link implementation with proper transfer speed, noise immunity, and low power consumption is suitable.

Figure 7:
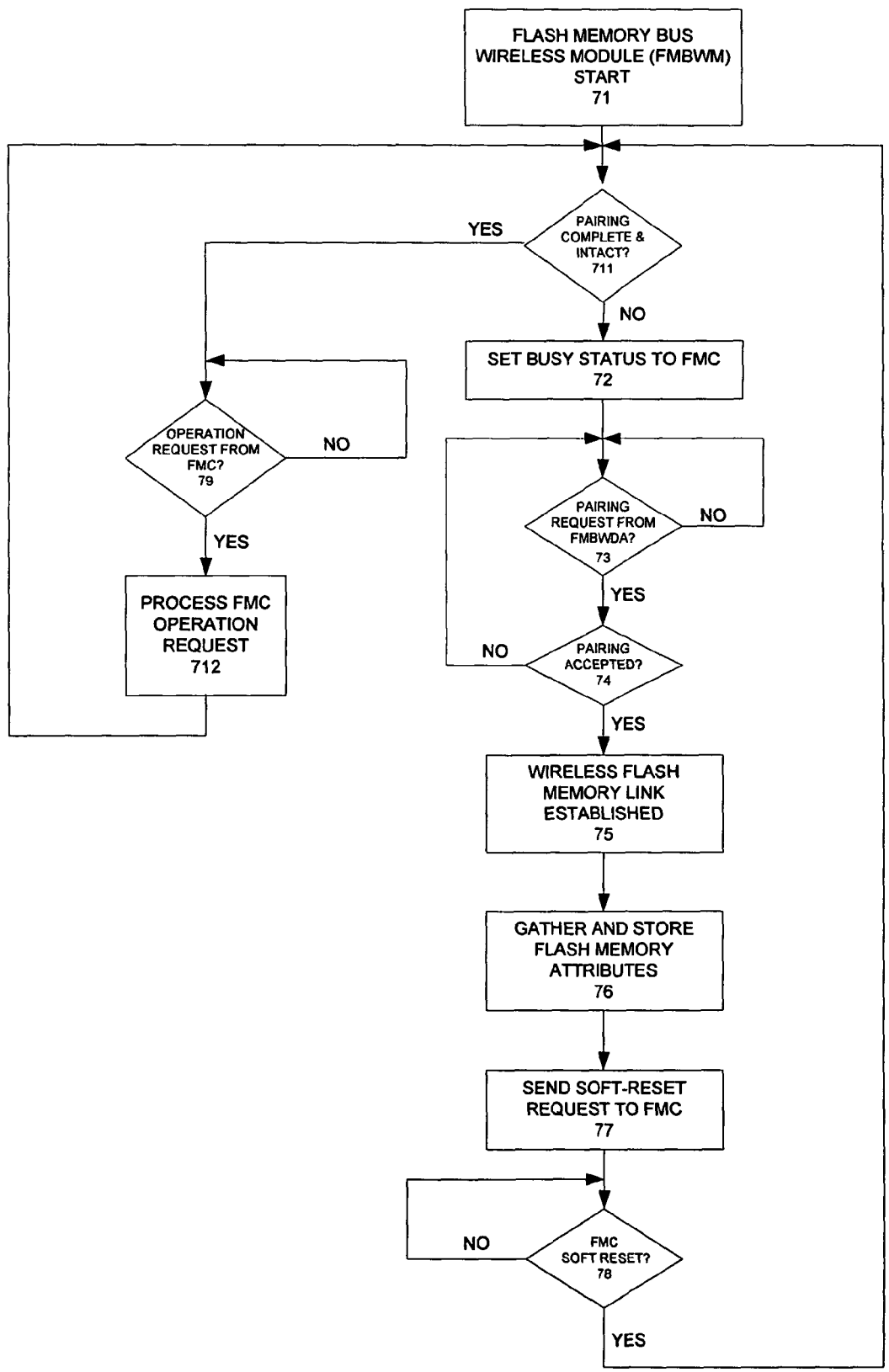
FIG. 7 is a flow chart of a flash memory bus wireless module initialization, pairing and operation.

It is important that the flash memory bus wireless module and the flash memory bus wireless devices adapter be initialized, paired and allowed to operate appropriately. To describe these features in more detail, refer now to the following description. FIG. 7 is a flow chart of a flash memory bus wireless module initialization, pairing and operation. Referring to FIGS. 5A, 5B and 7 together, after the flash memory wireless host adapter 500 is plugged into the flash memory card connector 511 of host device 510, the flash memory bus wireless module 55 initializes, as shown in FIG. 7. The wireless module 55 first checks if pairing is complete and intact, via step 711, via the flash memory bus wireless device adapter (FMBWDA) 550. The pairing process is important for authentication and security reasons to establish a logical link between the flash memory bus wireless module 55 and the flash memory bus wireless device adapter 550.

If the pairing is not successful, the wireless module 55 sends a BUSY status, via step 72, to the flash memory controller (FMC) 51. It then goes into a loop waiting for a pairing request, via step 73, wirelessly from FMBWDA 550 through the communication link of PHY 53 and antenna 54. The module 55 then checks to see if the pairing request is accepted, via step 74. If not, it goes back to wait for a pairing request, via step 73. If yes, the wireless module 55 establishes a wireless flash memory link, via step 75, with FMBWDA 550. By this time, the wireless module 55 has already gathered flash memory attributes. It stores flash memory attributes in a local buffer for use at a later time. The module 55 then sends a soft-reset 511 request, via step 77, to the flash memory controller (FMC) 51 and waits for a soft reset response from the flash memory controller 51 in a loop, via step 78. When the soft reset response from the flash memory controller 51 is received, it goes back to check if pairing is complete and intact, via step 711, and then begins the process all over again.

If the pairing is already complete and intact after the soft reset from flash memory controller (FMC) 51, the wireless module 55 goes into a loop, via step 79, to wait for an operation request from the flash memory controller (FMC) 51. If there is a valid operation request, it processes the FMC operation request, via step 712. It then goes back to check if pairing is complete and intact, via step 711. The process of initialization then starts all over again. In normal operation, the module 55 is in loop 711, 79 and 712, until pairing is broken or lost.

Figure 8:
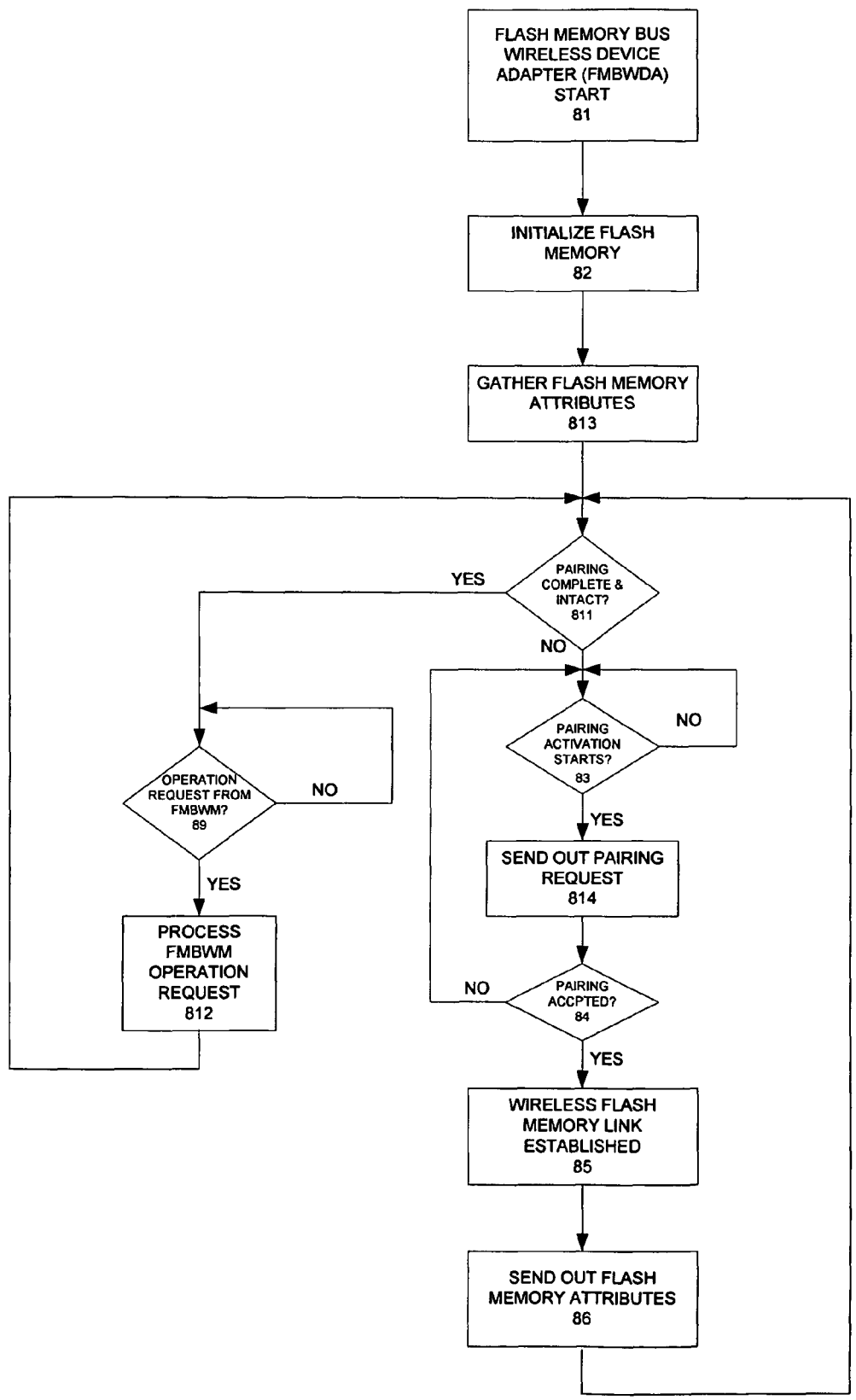
FIG. 8 is a flow chart of a flash memory bus wireless device adapter initialization, pairing and operation.

FIG. 8 is a flow chart of a flash memory bus wireless device adapter initialization, pairing and operation. Referring now to FIGS. 5A, 5B and 8 together, the flash memory bus wireless device adapter 550 initializes as shown in FIG. 8. The adapter 550 initializes flash memory 56 after power on, via step 82. It then gathers flash memory attributes, via step 813. Afterwards, it checks if pairing is complete and intact with the flash memory bus wireless module (FMBWM) 55, via step 811. The pairing process is important for authentication and security reasons to establish a logical link between the flash memory bus wireless module 55 and the flash memory bus wireless device adapter 550.

If the pairing is not successful, the adapter 550 goes into a loop, via step 83, waiting for pairing activation to start, via step 83. The pairing activation can be a hardware through a pairing button 575 or a software mechanism. If the pairing activation is started, the adapter 550 then sends out a pairing request wirelessly through the communication link of PHY 58 and antenna 59. It checks if a pairing request is accepted, via step 84. If not, the adapter 550 goes back to wait for pairing activation to start, via step 83. If yes, it establishes a wireless flash memory link with the FMBWM 55, via step 85. By this time, the adapter 550 has already gathered flash memory attributes. It sends out flash memory attributes to the FMBWM 55 through the communication link pairs of PHY 58, antenna 59, PHY 53 and antenna 54. The adapter 550 then goes back to check if pairing is complete and intact, via step 811, and starts all over again. In normal operation, the adapter 550 is in loop 811, 89 and 812, until pairing is broken or lost.

If the pairing is already complete and intact, the adapter 550 goes into a loop, via step 89, to wait for an operation request from the flash memory bus wireless module (FMBWM) 55. If there is a valid operation request, the adapter 550 processes the FMBWM operation request, via step 812. It then goes back to check if pairing is complete and intact, via step 811. The process then starts all over again.

A system and method in accordance with the present invention provides a flash memory card expansion system. The system comprises a flash memory wireless host adapter and a flash memory wireless device. The flash memory wireless host adapter is plugged into a flash memory card connector of a host device. The flash memory card command, data and status signals are converted as standard flash memory internal bus signals, which is a standard format. The signals are then fed into a flash memory bus wireless module. The flash memory bus wireless module comprises a flash memory media access control (MAC), an ultra-wideband (UWB) physical layer (PHY), and an antenna. All traffic through the blocks is bi-directional.

The corresponding flash memory bus wireless device comprises flash memory, a battery/power adapter, a flash memory internal bus, and a flash memory bus wireless device adapter. The flash memory interfaces with flash memory bus wireless device adapter through the flash memory internal bus in the same way as flash memory controller interfaces with flash memory bus wireless module through the flash memory internal bus.

The flash memory bus wireless device adapter comprises a flash memory media access control (MAC), an ultra-wideband (UWB) physical layer (PHY), and an antenna. All traffic through blocks are bi-directional.

An interface pairing activation mechanism is used by the flash memory bus wireless device adapter to pair with the flash memory bus wireless module. During initialization, the pairing activation is started to establish pairing between the flash memory bus wireless module and the flash memory bus wireless device adapter. Automatic or software pairing methods are also possible between the module and adapter.

By using the wireless flash memory bus module and the flash memory wireless device adapter, there is a significant savings in physical connection and a reduction in the number of silicon gates. Therefore it provides for a reduced size and less consumption in the wireless device.

Advantages

1. Allows wireless storage expansion to portable device.
2. Effortlessly expands storage density with no modification to existing portable device hardware and software.
3. Dedicates to flash memory and storage expansion, instead of general purpose I/O interface, for better efficiency.
4. Provides standard interface to existing flash memory or storage media for easy implementation and scalability.
5. Takes advantage of standard ultra-high speed radio frequency physical link for data transmission.
6. Shifts logic complexity of wireless device adapter to wireless host adapter.
7. Simplifies wireless device logic implementation and thus has advantage in cost saving, reduced physical size and less power consumption.
8. Allows pairing between wireless host adapter and wireless device for authentication and security.
9. Provides Write-through and Delay-write operation.
10. Provides Delay-read and Read-ahead operation to compensate for error prone and asynchronous nature of wireless communication link.
11. Provides Error-retry operation to compensate for error prone and asynchronous nature of wireless communication link.
12. Initiates soft reset request to flash memory controller after wireless flash memory link is established. It in turn forces host device to re-enumerate flash memory wireless host adapter.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A flash memory card system comprising:
   a flash memory wireless host adapter, wherein the flash memory wireless host adapter comprises a flash memory card connector, a flash memory controller coupled to the flash memory card connector, and a flash memory bus wireless module coupled to the flash memory controller, wherein flash memory command, data and status signals are converted to the standard flash memory internal bus signals via the flash memory controller, wherein the flash memory bus wireless module wirelessly communicates with a flash memory bus wireless device to expand a host device storage capacity; and
   the flash memory bus wireless device, wherein the flash memory bus wireless device comprises a flash memory, and a flash memory bus wireless device adapter coupled to the flash memory, wherein when the flash memory controller initiates a flash status read operation request using a read ahead mechanism with no delay, previous or deferred flash status data read operation requests are used to acquire a ready flash read status directly connecting the flash memory controller to the flash memory at the time of the request, and wherein when the flash memory controller initiates a flash status read operation request using a delay read mechanism, the flash memory controller receives a busy flash read status until it receives a ready flash read status to complete the flash status read operation request.

2. The flash memory card system of claim 1 wherein the flash memory card connector comprises any of Secure Digital (SD) format, Compact flash (CF) format, Multimedia Card (MMC) format, Memory Stick (MS) format and Universal Serial Bus (USB) format.

3. The flash memory card system of claim 1 wherein the flash memory bus wireless module comprises:
   a first flash memory media access controller;
   a first wireless bus physical layer in communication with the first flash memory media access controller; and
   a first antenna for providing a wireless signal.

4. The flash memory card system of claim 1 wherein the flash memory bus wireless device adapter comprises:
   a second flash memory media access controller;
   a second wireless bus physical layer in communication with the second flash memory media access controller; and
   a second antenna for providing a wireless signal.

5. The flash memory card system of claim 1 wherein the flash memory bus wireless device includes a pairing element for causing the flash memory bus wireless module to be paired with the flash memory wireless host adapter.

6. The flash memory card system of claim 5 wherein the pairing is performed by software.

7. The flash memory card system of claim 5 wherein during initialization the pairing element is activated to establish pairing between the flash memory wireless module and the flash memory bus wireless device adapter.

8. The flash memory card system of claim 5 wherein the pairing is performed automatically.

9. The flash memory card system of claim 1 wherein the flash memory bus wireless module initiates a soft reset request to the flash memory controller after a wireless flash memory link is established, and wherein the flash memory controller via the soft reset in turn forces a host device to re-enumerate the Flash memory wireless host adapter.

10. A system comprising:
    a host device; and
    a flash memory card system comprising a flash memory wireless host adapter, wherein the flash memory wireless host adapter comprises a flash memory card connector, a flash memory controller coupled to the flash memory card connector, and a flash memory bus wireless module coupled to the flash memory controller, wherein flash memory command, data and status signals are converted to the standard flash memory internal bus signals via the flash memory controller, wherein the flash memory bus wireless module wirelessly communicates with a flash memory bus wireless device to expand a host device storage capacity; and
    the flash memory bus wireless device, wherein the flash memory bus wireless device comprises a flash memory, and a flash memory bus wireless device adapter coupled to the flash memory, wherein when the flash memory controller initiates a flash status read operation request using a read ahead mechanism with no delay, previous of deferred flash status data read operation requests are used to acquire a ready flash read status directly connecting the flash memory controller to the flash memory, and wherein when the flash memory controller initiates a flash status read operation request using a delay read mechanism, the flash memory controller receives a busy flash read status until it receives a ready flash read status to complete the flash status read operation request.

11. The system in accordance with claim 10 wherein the flash memory card connector comprises any of Secure Digital (SD) format, Compact flash (CF) format, Multimedia Card (MMC) format, Memory Stick (MS) format and Universal Serial Bus (USB) format.

12. The system in accordance with claim 10 wherein the flash memory bus wireless module comprises:
    a first flash memory media access controller;
    a first wireless bus physical layer in communication with the first flash memory media access controller; and
    a first antenna for providing a wireless signal.

13. The system in accordance with claim 10 wherein the flash memory bus wireless device adapter comprises:
    a second flash memory media access controller;
    a second wireless bus physical layer in communication with the second flash memory media access controller; and
    a second antenna for providing a wireless signal.

14. The system in accordance with claim 10 wherein the flash memory bus wireless device includes a pairing element for causing the flash memory bus wireless module to be paired to the flash memory wireless host adapter.

15. The system in accordance with claim 14 wherein the pairing is performed by software.

16. The system in accordance with claim 14 wherein during initialization the pairing element is activated to establish pairing between the flash memory wireless module and the flash memory bus wireless device adapter.

17. The system in accordance with claim 14 wherein the pairing is performed automatically.

18. The system in accordance with claim 10 wherein the host device comprises any of or any combination of digital still cameras, personal digital assistants, MP3 players, personal media players, cell phones, and portable consumer electronic devices.

19. The system of claim 10 wherein the flash memory bus wireless module initiates a soft reset request to the flash memory controller after a wireless flash memory link is established, and wherein the flash memory controller via the soft reset in turn forces a host device to re-enumerate the Flash memory wireless host adapter.

20. A flash memory card system comprising:
    a flash memory to hard drive wireless host adapter, wherein the flash memory to hard drive wireless host adapter comprises a flash memory card connector, a flash memory to hard drive converter controller coupled to the flash memory card connector, and a hard drive I/O bus wireless host module coupled to the flash memory to hard drive converter controller, wherein flash memory command, data and status signals are converted to the standard flash memory internal bus signals via the flash memory to hard drive converter controller, wherein the hard drive I/O bus wireless host module wirelessly communicates with a hard drive I/O bus wireless device module to expand a host device storage capacity; and
    the hard drive I/O bus wireless device module, wherein the hard drive I/O bus wireless device module comprises a hard drive, and a hard drive I/O bus wireless device module coupled to the hard drive, wherein when the flash memory to hard drive converter controller initiates a flash status read operation request using a read ahead mechanism with no delay, previous or deferred flash status data read operation requests are used to acquire a ready flash read status directly connecting the flash memory to hard drive converter controller to the hard drive, and wherein when the flash memory to hard drive converter controller initiates a flash status read operation request using a delay read mechanism, the flash memory to hard drive converter controller receives a busy flash read status until it receives a ready flash read status to complete the flash status read operation request.

21. The flash memory card system of claim 20 wherein the flash memory card connector comprises any of Secure Digital (SD) format, Compact flash (CF) format, Multimedia Card (MMC) format, Memory Stick (MS) format and Universal Serial Bus (USB) format.

22. The flash memory card system of claim 20 wherein the hard drive I/O bus wireless host module comprises:
   a first hard drive I/O media access controller;
   a first wireless bus physical layer in communication with the first hard drive I/O media access controller; and
   a first antenna for providing a wireless signal.

23. The flash memory card system of claim 20 wherein the hard drive wireless device module comprises:
   a second hard drive I/O media access controller;
   a second wireless bus physical layer in communication with the second hard drive I/O media access controller; and
   a second antenna for providing a wireless signal.

24. The flash memory card system of claim 20 wherein the direct attached storage wireless device includes a pairing element for causing the direct attached storage wireless device to be paired with the flash memory to hard drive wireless host adapter.

25. The flash memory card system of claim 24 wherein the pairing is performed by software.

26. The flash memory card system of claim 24 wherein during initialization the pairing element is activated to establish pairing between the hard drive I/O bus wireless device module and the hard drive I/O bus wireless host module.

27. The flash memory card system of claim 24 wherein the pairing is performed automatically.

28. The flash memory card system of claim 20 wherein the flash memory bus wireless module initiates a soft reset request to the flash memory controller after a wireless flash memory link is established, and wherein the flash memory controller via the soft reset in turn forces a host device to re-enumerate the Flash memory wireless host adapter.

29. A flash memory card system comprising:
   a flash memory wireless host adapter, wherein the flash memory wireless host adapter comprises a flash memory card connector, a flash memory controller coupled to the flash memory card connector, and a flash memory bus wireless module coupled to the flash memory controller, wherein flash memory command, data and status signals are converted to the standard flash memory internal bus signals via the flash memory controller, wherein the flash memory bus wireless module wirelessly communicates with a flash memory bus wireless device to expand a host device storage capacity; and
   the flash memory bus wireless device, wherein the flash memory bus wireless device comprises a flash memory, and a flash memory bus wireless device adapter coupled to the flash memory, wherein when the flash memory controller initiates a flash data write operation request using a write through mechanism with no delay, previous or deferred flash data write operation requests are used to acquire a ready flash write status directly connecting the flash memory controller to the flash memory, and wherein when the flash memory controller initiates a flash data write operation request using a delay write mechanism, the flash memory controller receives a busy flash write status until it receives a ready flash write status to complete the flash data write operation request.

\* \* \* \* \*